(12) United States Patent
Guillorn et al.

(10) Patent No.: US 9,558,310 B2
(45) Date of Patent: Jan. 31, 2017

(54) METHOD AND SYSTEM FOR TEMPLATE PATTERN OPTIMIZATION FOR DSA PATTERNING USING GRAPHOEPITAXY

(71) Applicant: International Business Machines Corporation, Armonk, NY (US)

(72) Inventors: Michael A. Guillorn, Yorktown Heights, NY (US); Kafai Lai, Poughkeepsie, NY (US); Melih Ozlem, Fishkill, NY (US); Hsinyu Tsai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 14/723,570

(22) Filed: May 28, 2015

(65) Prior Publication Data
US 2016/0350465 A1    Dec. 1, 2016

(51) Int. Cl.
*G06F 17/50* (2006.01)
*H01L 27/088* (2006.01)

(52) U.S. Cl.
CPC ....... *G06F 17/5068* (2013.01); *H01L 27/0886* (2013.01)

(58) Field of Classification Search
CPC .............. G06F 17/5081; G06F 2217/12; H01L 21/3086; H01L 21/0273; H01L 21/3081
USPC .......................................................... 716/54
See application file for complete search history.

(56) References Cited

U.S. PATENT DOCUMENTS

| | | | |
|---|---|---|---|
| 8,255,869 B2 * | 8/2012 | Weatherhead | G06F 8/10 700/97 |
| 8,468,480 B2 * | 6/2013 | Inanami et al. | G06F 17/5081 716/110 |
| 8,656,322 B1 | 2/2014 | Dechene et al. | |
| 8,771,929 B2 | 7/2014 | Guillorn et al. | |
| 8,790,522 B1 * | 7/2014 | Schmid et al. | H01L 21/0337 216/17 |
| 8,828,253 B2 * | 9/2014 | Koole et al. | B81C 1/00031 216/38 |
| 8,889,343 B2 * | 11/2014 | Preil et al. | G03F 7/0002 430/322 |
| 2013/0273330 A1 * | 10/2013 | Wang et al. | B81C 1/0038 428/172 |

(Continued)

OTHER PUBLICATIONS

X.-Y. Bao et al., "SRAM, NAND, DRAM Contact Hole Patterning Using Block Copolymer Directed Self-Assembly Guided by Small Topographical Templates," IEEE International Electron Devices Meeting (IEDM), Dec. 2011, pp. 7.7.1-7.7.4.

(Continued)

*Primary Examiner* — Sun Lin
(74) *Attorney, Agent, or Firm* — Louis J. Percello; Ryan, Mason & Lewis, LLP

(57) ABSTRACT

A method for design template pattern optimization, comprises receiving a design for a fin field effect transistor (FinFET) device, wherein the design includes a configuration of fins, creating a design template pattern for the design for use in connection with directed self-assembly (DSA) patterning using graphoepitaxy, and optimizing the design template pattern to minimize pattern density gradients, wherein the design template pattern includes a plurality of guiding lines for guiding a block-copolymer deposited during the DSA patterning and the optimizing comprises altering the guiding lines.

9 Claims, 12 Drawing Sheets

(56) References Cited

U.S. PATENT DOCUMENTS

2014/0069325 A1* 3/2014 Kawanishi .............. C30B 19/00
  117/54
2014/0116980 A1* 5/2014 Wuister ................ G03F 7/0002
  216/11

OTHER PUBLICATIONS

H. Tsai et al., "Electrical Characterization of FinFETs with Fins Formed by Directed Self Assembly at 29 nm Fin Pitch Using a Self-Aligned Fin Customization Scheme," IEEE International Electron Devices Meeting (IEDM), Dec. 2014, pp. 32.1.1-32.1.4.

H. Tsai et al., "Two-Dimensional Pattern Formation Using Graphoepitaxy of PS-b-PMMA Block Copolymers for Advanced FinFET Device and Circuit Fabrication," ACS Nano, May 2014, pp. 5227-5232, vol. 8, No. 5.

\* cited by examiner

1000

1100

METHOD AND SYSTEM FOR TEMPLATE PATTERN OPTIMIZATION FOR DSA PATTERNING USING GRAPHOEPITAXY

This invention was made with Government support under Contract No. FA8650-10-C-7038 awarded by the Defense Advanced Research Projects Agency (DARPA). The Government has certain rights to this invention.

TECHNICAL FIELD

The field generally relates to methods and systems for design template pattern optimization and, in particular, methods and systems for preparing template data for graphoepitaxy patterning of fins in FinFET circuits using DSA.

BACKGROUND

Field effect transistors (FETs) composed of discrete silicon (Si) active regions or "fins," referred to as FinFETs, have desirable electrostatic properties compared to planar devices. In connection with FinFETs, sublithographic line space patterning can be based on the directed self-assembly (DSA) of block copolymers (BCPs). DSA is a technique that utilizes phase separation of a BCP thin film in order to form a sublithographic line space pattern. BCP films naturally phase separate into periodic patterns with a feature size pre-defined by the molecular weights of the BCP. By combining bottom up lamellae forming self-assembling materials with top down lithographically defined template patterns, gratings at relatively small pitches can be achieved. Features, such as, for example, resolution and the critical dimension (CD) of a pattern are dependent on a composition of the copolymer used in DSA processing.

In a DSA process, phase separated copolymers can be aligned using self-assembly guided by, for example, surface topography, referred to as graphoepitaxy, and/or surface chemical patterning, referred to as chemoepitaxy. More specifically, DSA uses a template layer to cause desired alignment of phase separated polymers. For example, DSA by chemoepitaxy utilizes a chemical pattern to align a block copolymer deposited on the chemical pattern. DSA by graphoepitaxy utilizes surface topography (e.g., trenches) to align a deposited block copolymer to create desired line and space patterns.

Since the BCPs self-assemble at a certain pitch, DSA can provide relatively simple processing, compared to multiple exposures or multiple depositions and etching, and high resolution of features at small dimensions (e.g., less than 10 nm). DSA is compatible with existing lithography techniques, and allows for frequency multiplication and space subdivision.

SUMMARY

In general, exemplary embodiments of the invention provide a method and system for preparing template data for graphoepitaxy patterning of fins in FinFET circuits using DSA that results in defect free patterns over large areas. In accordance with embodiments of the present invention, data produced by designers is used to derive two types of patterns, including a template pattern to define DSA pattern regions, and a cut mask pattern to remove unwanted patterns. The template patterns are prepared in a way that minimizes template area and avoids pattern density gradients. By utilizing both the template patterns and cut mask patterns in accordance with embodiments of the present invention, large area defect free patterns are produced.

According to an exemplary embodiment of the present invention, a method for design template pattern optimization, comprises receiving a design for a FinFET device, wherein the design includes a configuration of fins, creating a design template pattern for the design for use in connection with DSA patterning using graphoepitaxy, and optimizing the design template pattern to minimize pattern density gradients, wherein the design template pattern includes a plurality of guiding lines for guiding a block-copolymer deposited during the DSA patterning and optimizing comprises altering the guiding lines.

According to an exemplary embodiment of the present invention, a computer program product for design template pattern optimization, comprises a non-transitory computer readable storage medium having program instructions embodied therewith, the program instructions executable by a processor to cause the processor to perform the above method.

According to an exemplary embodiment of the present invention, an apparatus for design template pattern optimization comprises a memory, and a processing device operatively coupled to the memory and configured to receive a design for a FinFET device, wherein the design includes a configuration of fins, create a design template pattern for the design for use in connection with DSA patterning using graphoepitaxy, and optimize the design template pattern to minimize pattern density gradients, wherein the design template pattern includes a plurality of guiding lines for guiding a block-copolymer deposited during the DSA patterning and optimizing comprises altering the guiding lines.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to methods and systems for design template pattern optimization and, in particular, methods and systems for preparing template data for graphoepitaxy patterning of fins in FinFET circuits using DSA that results in defect free patterns over large areas. This invention may be embodied in many different forms and should not be construed as limited to the embodiments set forth herein.

In general, there are spaces between fins of FinFET, and in designing a FinFET device, template guiding lines with a certain lithography are formed in the spaces. Using graphoepitaxy, a copolymer formed in trenches in the spaces fills in the trenches along the guiding lines. Embodiments of the present invention relate to, for example, the selection of locations for the guiding lines, spacing between guiding lines, and whether to include guiding lines or leave an open space for the copolymer to fill in, and cut lines after copolymer deposition. Embodiments of the present invention further relate to algorithms for outputting a template inputting based on a target fin pattern.

According to an embodiment of the present invention, design pattern data representing a target fin pattern/layout for a semiconductor device is provided by a designer. The design pattern data includes shapes used to define boundaries of regions where fins are to be retained. The shapes can be resized using a look up table. This data is referred to herein as FH.

A look up table corresponds to particular copolymers. Values in the look up table are defined by the gap spacing required to produce a desired number of DSA lines using the graphoepitaxy process. With the understanding of the properties of a copolymer and that different copolymers produce lines of different pitch and size, the lookup table provides information regarding, for example, a required size of a trench to result in a specified number of lines of a copolymer. For example, a look up table may state that a 19 nm trench is needed to result in 3 lines of a particular copolymer when the copolymer fills in the trench. For each copolymer in the lookup table, the lookup table will include information such as a ratio of a number of lines of copolymer to a width of a trench. Values may change depending on which phase of the polymer is being used to form an image. For example, for a copolymer consisting of polymer A and polymer B, the optimal trench sizes will depend on whether the trench sidewalls preferentially interact with A or B, and whether the final fin pattern is formed with A or B.

Figure 1B:
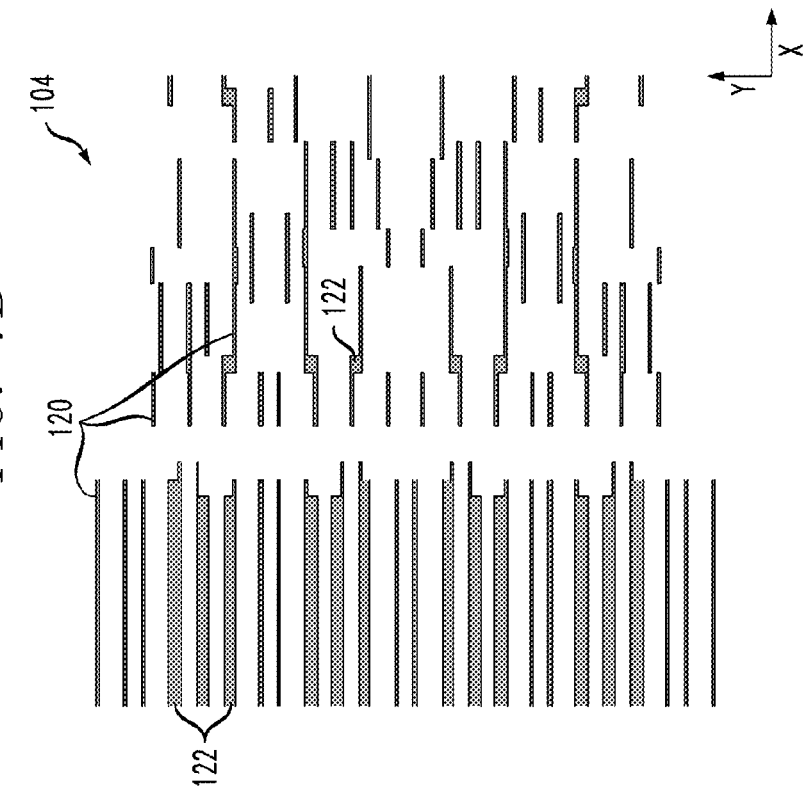
FIGS. 1A and 1B respectively illustrate a target fin pattern, and a design template, in accordance with an exemplary embodiment of the present invention.
Figure 1A:
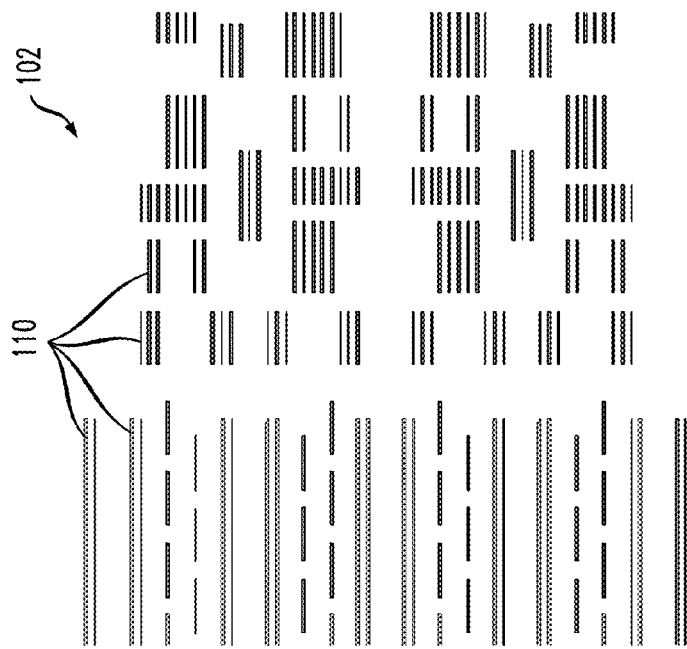

The shapes are merged to remove small gaps. For example, FIGS. 1A and 1B respectively illustrate a target fin pattern 102, and a design template 104 in accordance with an exemplary embodiment of the present invention. As shown in FIG. 1B, trench guiding lines 120 can be formed to overlap each other, to include lines widened 122 thereon above or below the guiding lines, and/or to be connected where there would be small gaps between fins 110. Such structures can result in longer left-to-right shapes (X direction) resulting in better flow and a reduction of defects. For example, the merging is done to prevent a copolymer, once it is deposited to fill in a trench, from running in a direction that is not along an extension direction of the trench. For example, the design template 104 includes directional guidelines 120 for trenches extending in the X direction. As shown in FIG. 1B, the directional guidelines 120 in the design template 104 may overlap with adjacent directional guidelines in the X direction, or a gap between directional guidelines in the X direction may be closed up to prevent the copolymer from running in the Y direction.

More specifically, in order to create a final template, in accordance with a non-limiting illustrative embodiment of the present invention, FH data is biased in the X direction by an amount +/−2 contacted poly pitch (CPP) (also referred to as gate pitch) to merge into continuous shapes. For example, the data is extended by 10 nm in the Y direction and logical ANDed with inverted X-merged data. This produces lines that are above and below the fins of the target pattern. Small gaps are then removed and merged with the template data.

Figure 2B:
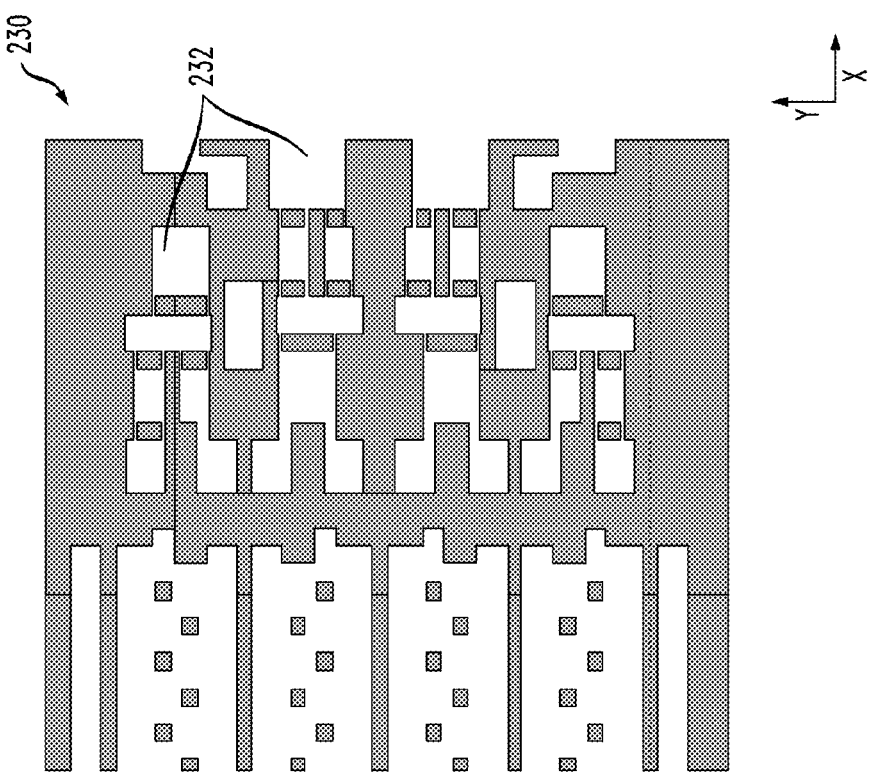
FIG. 2B illustrates a cut mask, in accordance with an exemplary embodiment of the present invention.
Figure 2A:
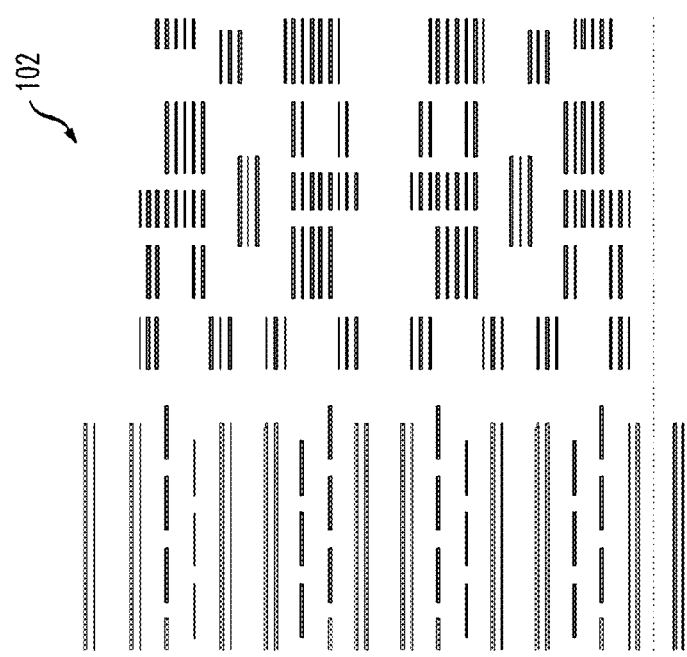
FIG. 2A illustrates a target fin pattern, in accordance with an exemplary embodiment of the present invention.

Referring to FIGS. 2A and 2B, the spaces in between patterns (e.g., see reference numeral 108 and arrows showing some spaces between patterns) on design template 104 that are not part of the design will produce DSA lines. As shown in FIG. 2B, cut mask data is generated to produce a cut mask 230 to remove these regions with the produced DSA lines that are not part of the design. It is noted that FIG. 2A is the same as FIG. 1A, and is shown adjacent FIG. 2B for purposes of explanation. After a copolymer fills in the design template 104, a cut mask 230 is used to remove those regions where DSA lines formed, but are not part of the design. The openings 232 in the cut mask 230 are portions that are part of the design. Patterns under the solid region can be removed by, for example, etching. For example, etch strip is used to remove the cut mask.

As an example of an algorithm for cut mask pattern generation, the template data is ORed with the original FH data. This merged data is subtracted from the inverted FH data to create the cut mask data. The inverted FH area is where fins should be removed and self-aligned cuts of DSA lines are formed in the template area. In other words, a cut in the cut mask is generated when there is not a self-aligned cut.

Referring to FIGS. 3-6, template patterns can be optimized to minimize pattern density gradients. For example, FIGS. 3-5 each show a desired fin design 310, 410 and 510, design templates 320, 420, 521 and 522 used to form a device having the desired fin designs, and actual results 330, 430, 531 and 532 respectively corresponding to templates 320, 420, 521 and 522.

Figure 3:
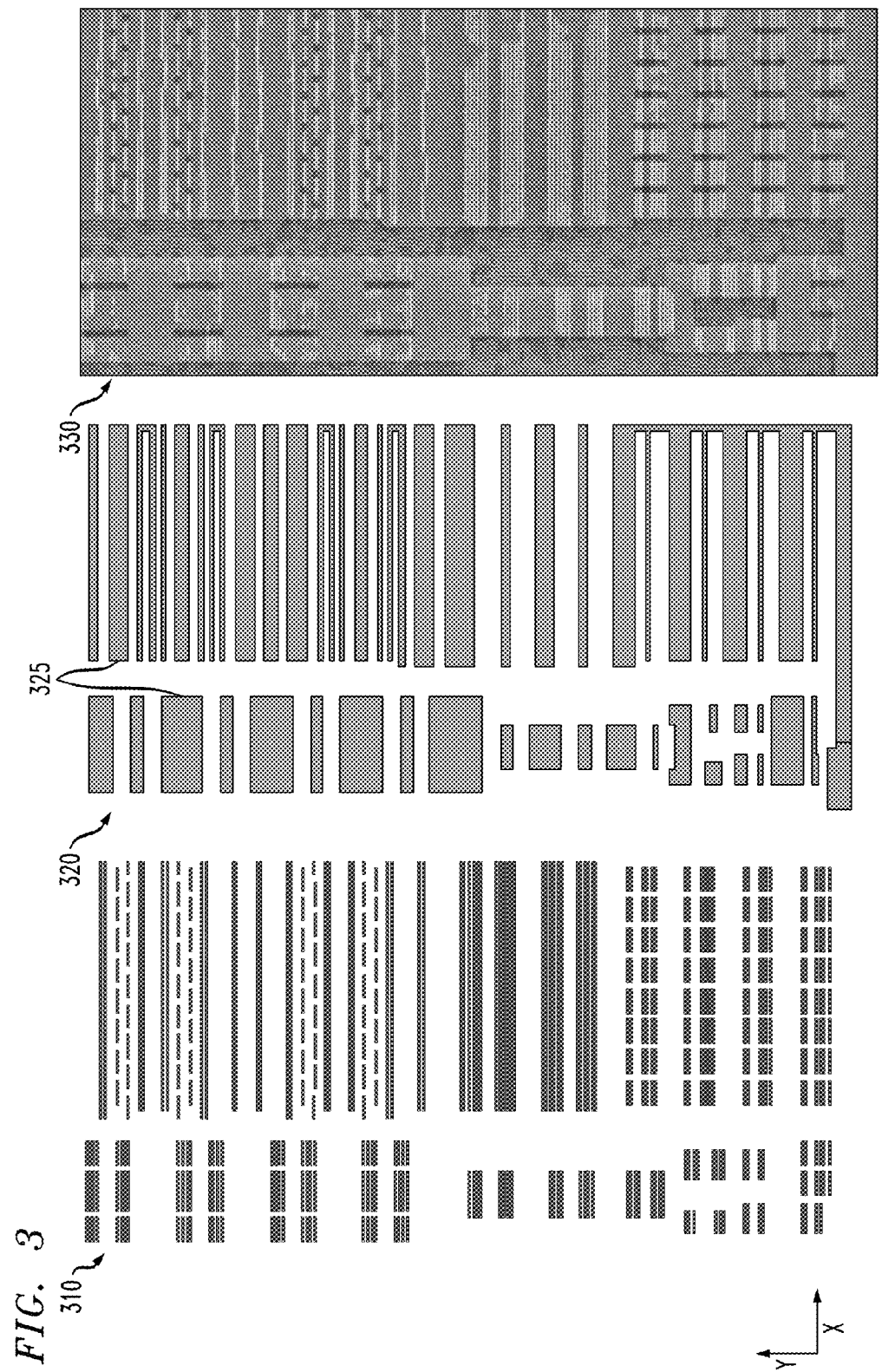
FIGS. 3, 4 and 5 each show a desired fin design, design templates used to form a device having the desired fin designs, and actual results corresponding to the design templates, in accordance with exemplary embodiments of the present invention.
Figure 4:
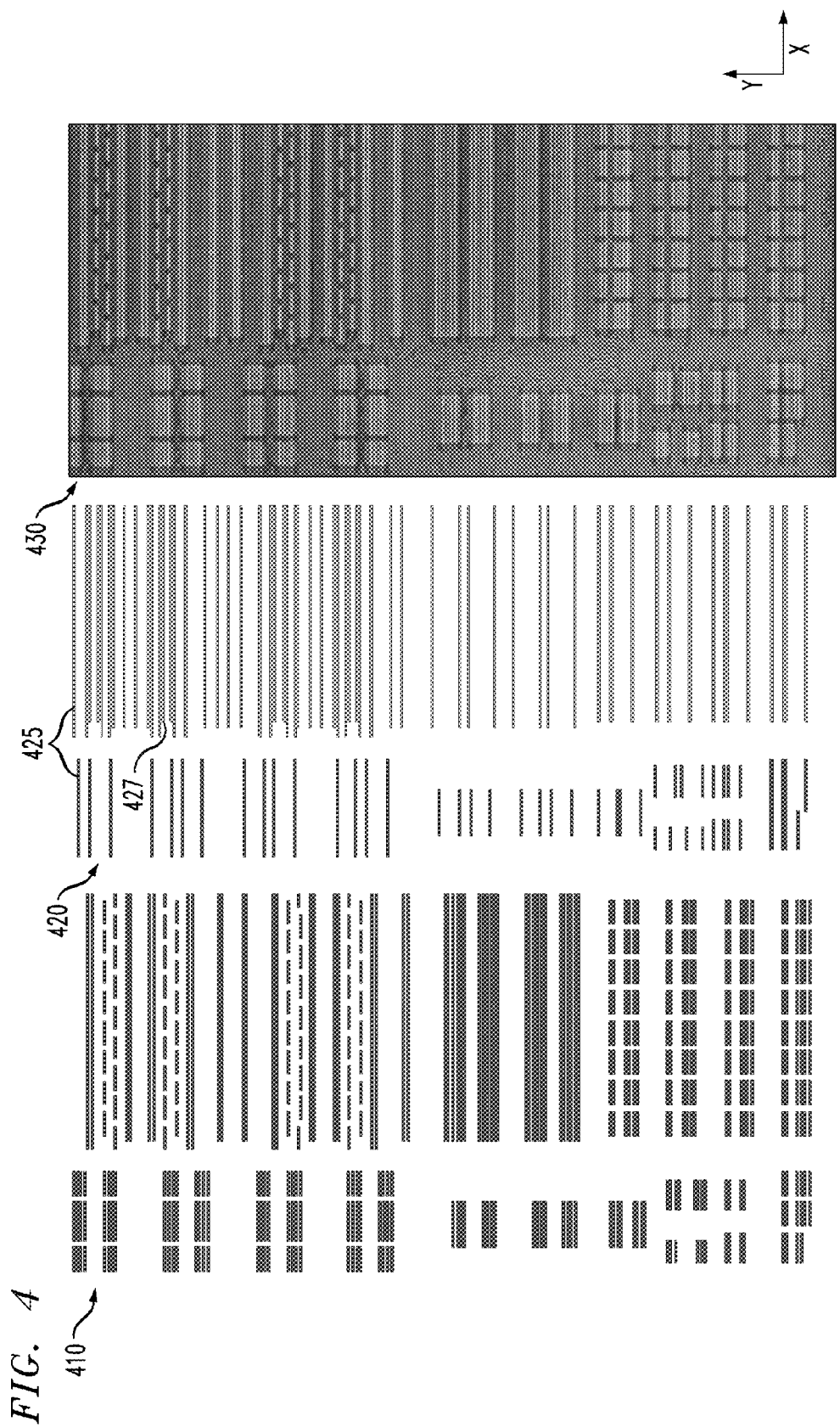

Comparing the results 330 and 430 from respective design template patterns 320 and 420 in FIGS. 3 and 4, the narrower guiding lines 425 in template 420, when compared with the wider guiding lines 325 in template 320 provide results 430 that more closely match the desired design than the results 330 when using the wider guiding lines in template 320. In addition, the narrower guiding lines 425 can be used in conjunction with slightly wider lines 427 corresponding to gaps in the desired design 410. The template regions are removed after deposition of the copolymer to form self-aligned gaps and are only used when self-aligned cut is required. For example, a wider gap is decomposed into two narrow template lines with an additional cut mask, while line 427 uses a wider template line because there is not enough space to insert a cut mask with a width that can be patterned using conventional lithography.

Figure 5:
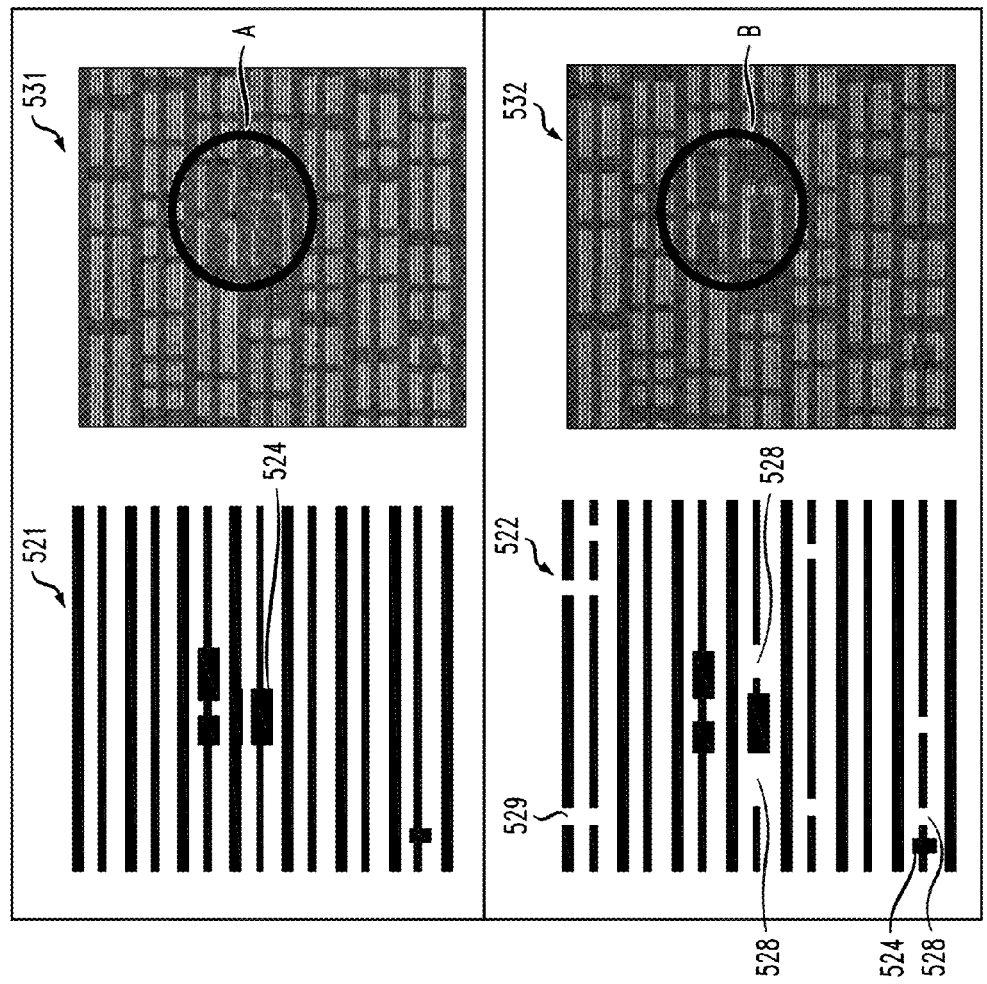
Figure 5:
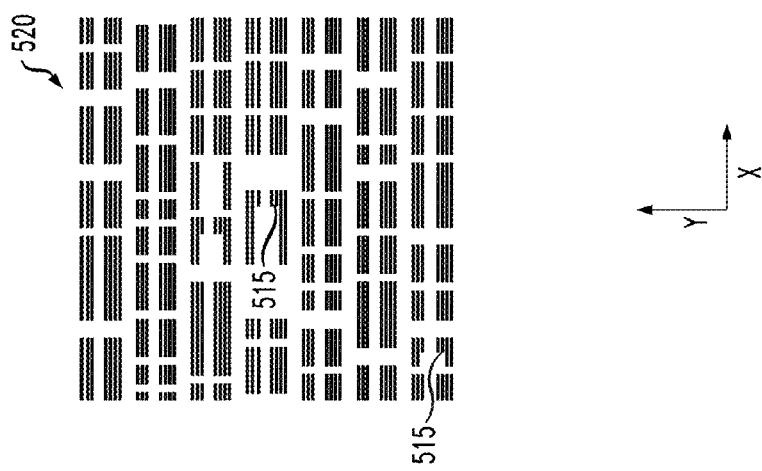

Referring to FIG. 5, a desired fin design 510 includes sharp transitions 515, such as sharp changes from, for example, two fins to four fins, where each line on the proposed design 510 represents a fin. The transition is not necessarily limited to a transition from 2 fins to 4 fins, and may include any other combinations of a change from a first number of fins to a second number of fins.

Figure 6:
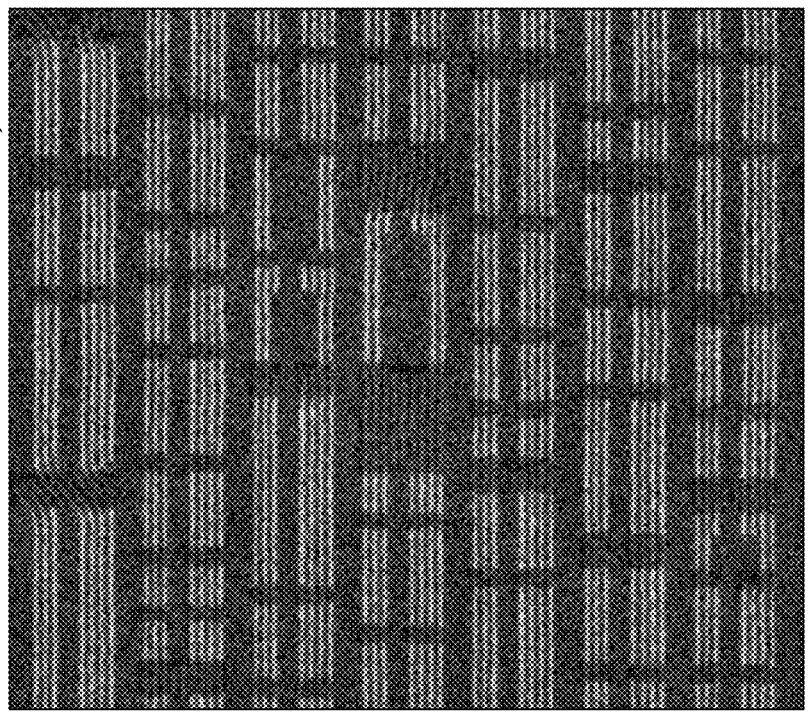
FIG. 6 shows magnified versions the resulting devices from FIG. 5.
Figure 6:
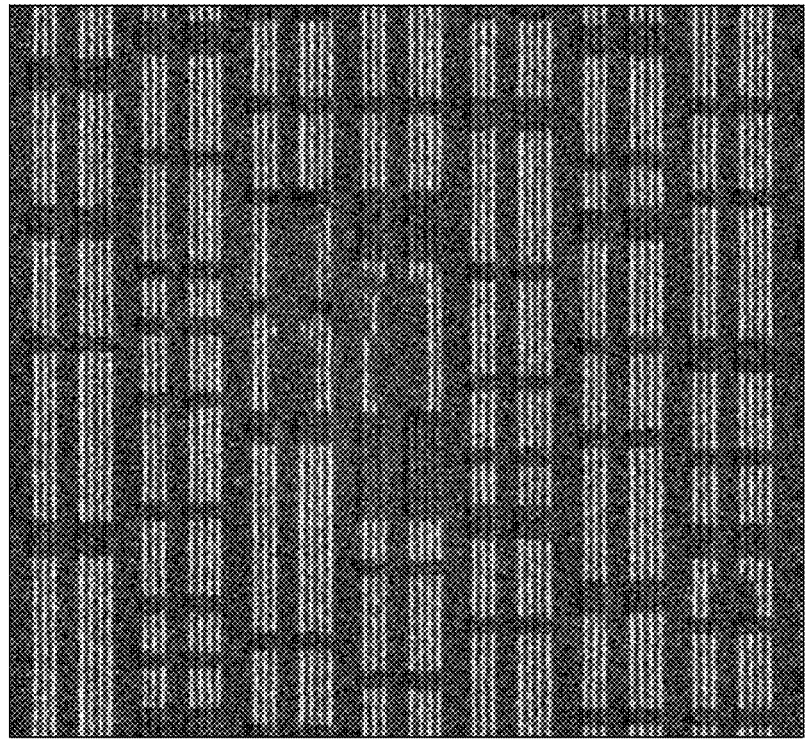

Sharp transitions, such as the sharp transitions 515 illustrated in FIG. 5, can be prone to defects when manufacturing a FinFET device using DSA. As shown in FIGS. 5 and 6, the introduction of gaps 528 in design template pattern 522 yields a resulting design 532 having a configuration which is closer to the desired fin design 510 than the configuration of resulting design 531, which used a continuous design template 521. As can be seen, the continuous design template 521 includes wider guiding lines 524 at areas corresponding to areas of decreased fins due to a transition, without any gaps. The design template 522 includes gaps 528, inserted near (e.g., before and/or after) wider guiding lines 524 corresponding to decreased fins due to a transition. As can be seen from circled portions A and B in FIG. 5, the areas in circular portion B, where the gaps 528 were used, have configurations which are closer to the desired fin design 510 than the configurations of the areas in circular portion A, where gaps were not used.

The design template pattern 522 also includes gaps 529 that do not correspond to transitions (e.g., in the top row of design template pattern 522). The gaps 529 can be omitted since the introduction of gaps where there are no transitions (like gaps 529) may cause resulting DSA lines to bend, as shown in resulting design 532.

FIG. 6 shows magnified versions 631, 632 of the resulting devices 531, 532 to further illustrate differences in configurations when introducing gaps 528 into a design template. Introduction of gaps into a template pattern, such as, for example, gaps 528, reduces defectivity in long tapers. This correlates to a minimization of pattern density gradients. Pattern density gradients maps can be used to optimize template patterns.

Figure 7:
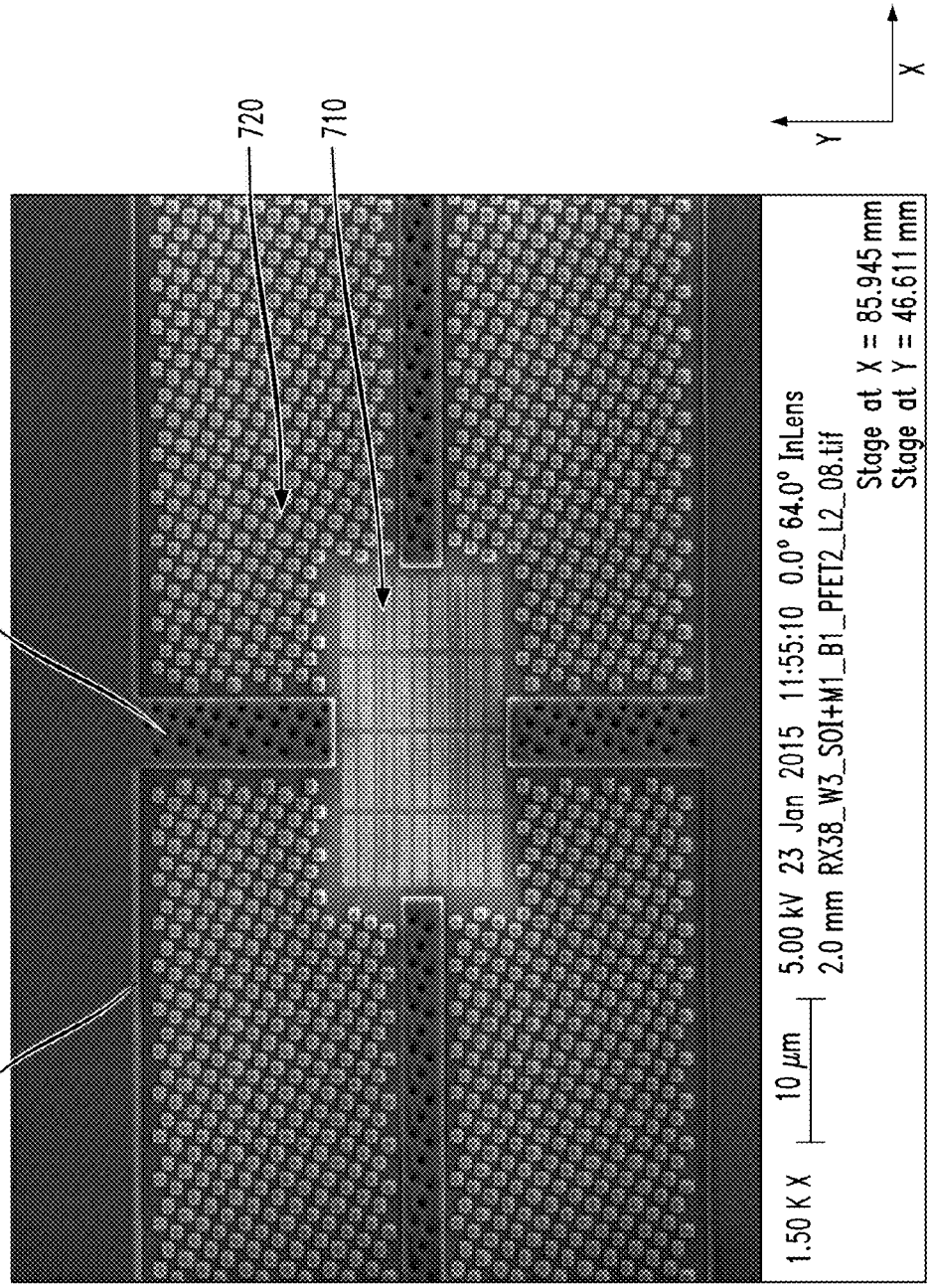
FIG. 7 illustrates a magnified image showing a design shape surrounded by conventional fill shapes in a FinFET device.

FIG. 7 illustrates a magnified image showing a design shape surrounded by conventional fill shapes in a FinFET device. In the image, the design shape 710 includes DSA fins etched into silicon. The magnification is not high enough to see the individual fins. The larger blocks 712 are the FH cut mask shape. The fill shapes 720 in this case were added after the fin formation process, so DSA was conducted with only template patterns in the center region where the design shape 710 is located. At this magnification, it is difficult to see where guiding lines were formed, but some non-uniformity in film coating may be observed. The rectangular portions 714 are metal leads that were superimposed on top after fins were formed Traditional fill shapes are large shapes at a distance from design shapes. Because pattern density can be critical for tone inverted graphoepitaxy, additional fill shapes help improve pattern uniformity and DSA yield.

Fill shapes in accordance with an embodiment of the present invention, are formed closer to design shapes than conventional fill shapes. The design shapes include, for example, guiding lines for trenches to form fins. The fill shapes comprise, for example, the same material that forms the template/guiding lines. In accordance with an embodiment of the present invention, the fill shapes are within approximately 100 nm of the design shapes, and fill in what has been conventionally empty space. The closer proximity of the fill shapes than conventional fill shapes results in a more stable device by guiding the locations of the design shapes to their desired locations to improve pattern uniformity and DSA yield when copolymers are deposited.

Figure 8A:
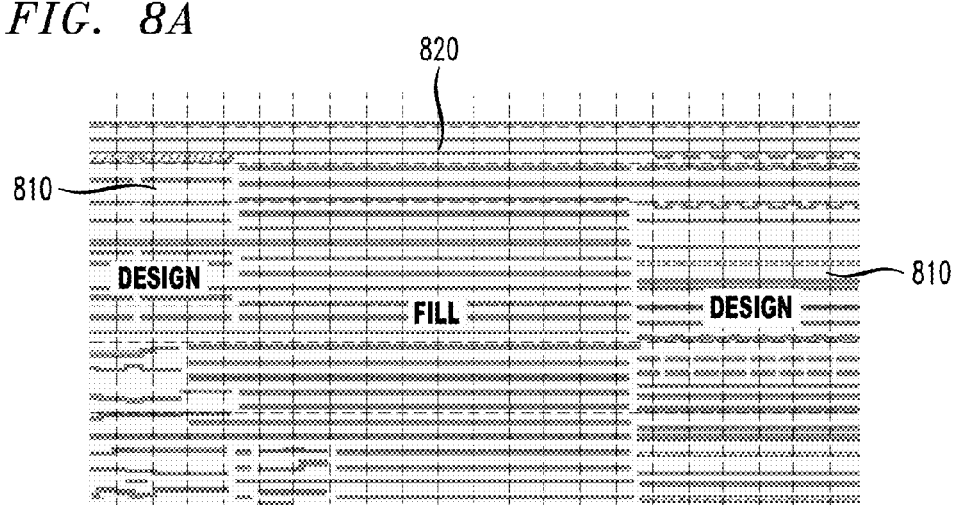
FIGS. 8A and 8B show configurations of design templates and fill shapes used in connection with DSA, according to an exemplary embodiment of the present invention.
Figure 8B:
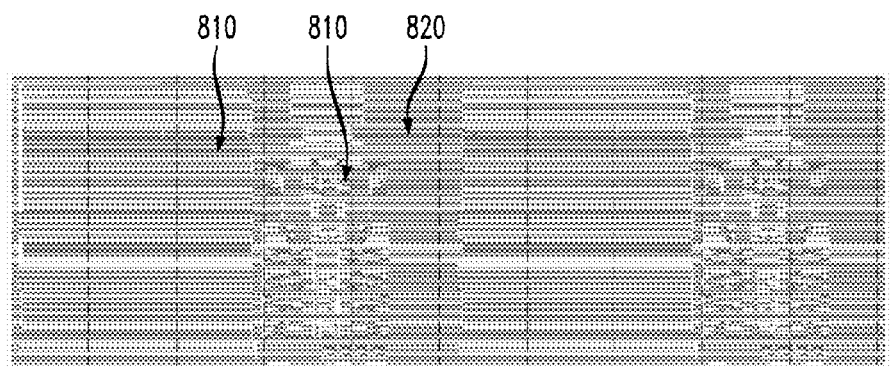

FIGS. 8A and 8B show configurations of design templates 810 and fill shapes 820 used in connection with DSA, according to an exemplary embodiment of the present invention. In accordance with an embodiment of the present invention, design template guiding lines are extended for approximately 0.1 um in length with respect to a conventional design template guiding lines, and fill shapes are distanced approximately 0.1 um from the extended design shapes. Fill shapes are designed such that trench sizes are optimal for DSA formation. More specifically, in accordance with an embodiment of the present invention, fill shapes include horizontal lines with trench sizes that are optimized to form, for example, a plurality of DSA lines, such as, 4 DSA lines. The actual trench sizes will come from a look-up table as described herein.

Figure 9A:
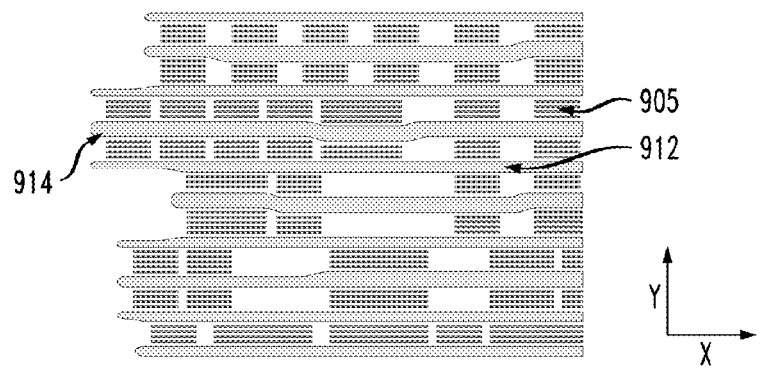
FIG. 9A is a diagram showing target fin patterns and design template guiding lines with extended portions, according to an exemplary embodiment of the present invention.
Figure 9B:
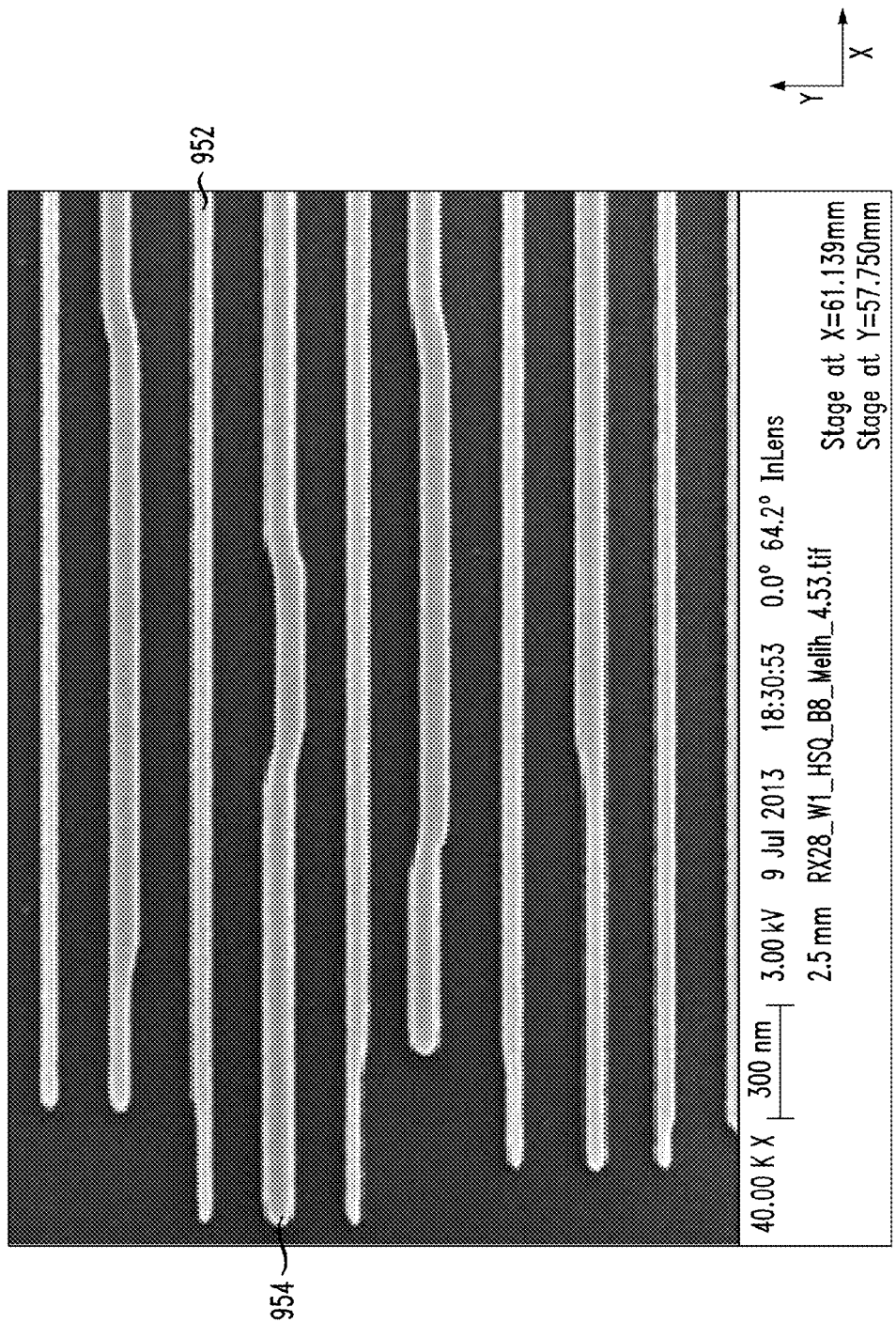
FIG. 9B is an image of a design template prior to DSA having guiding lines and extensions, according to an exemplary embodiment of the present invention.
Figure 9C:
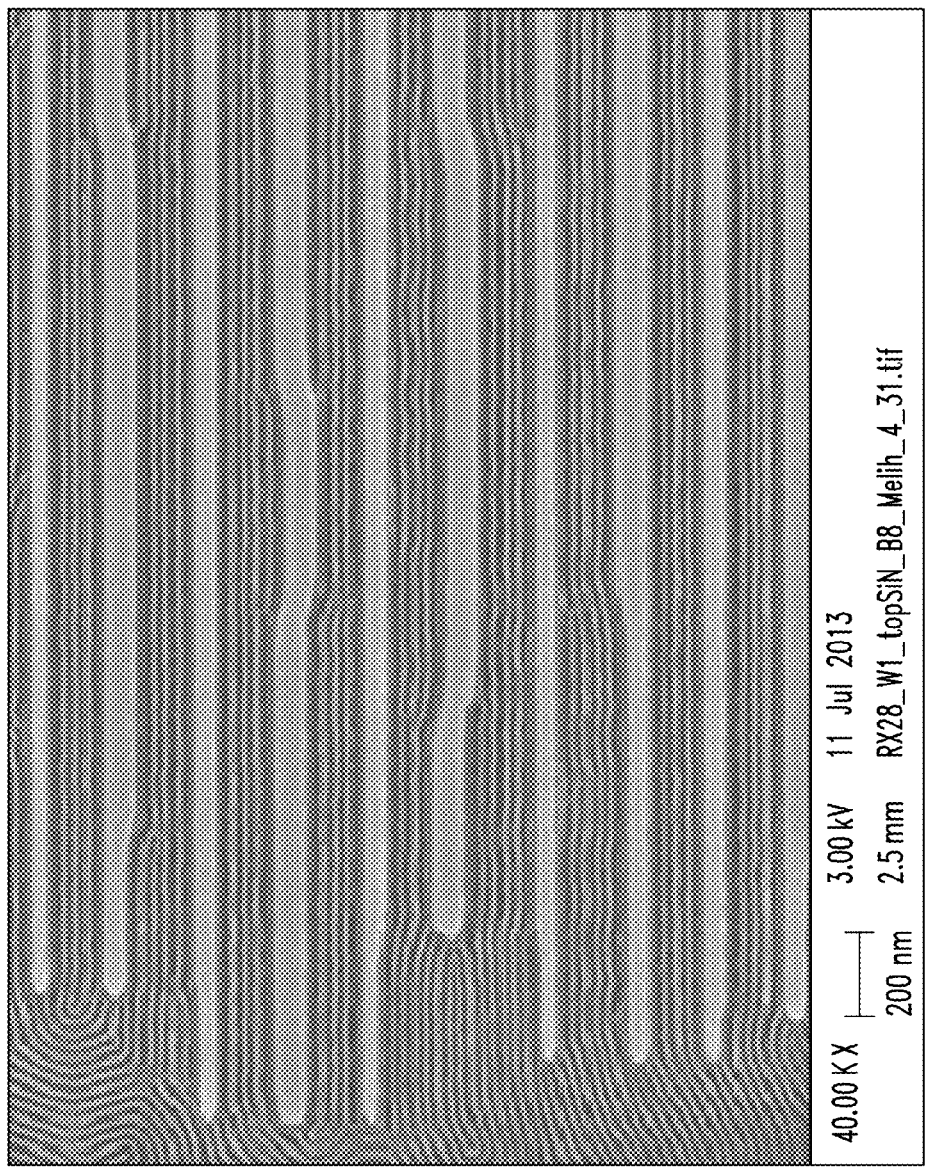
FIG. 9C is an image of the design template from FIG. 9B after DSA, according to an exemplary embodiment of the present invention.

FIG. 9A is a diagram showing target fin patterns 905 and design template guiding lines 912 with extended portions 914 (also referred to herein as template extensions). FIG. 9B is an image of a design template 950 prior to DSA having guiding lines 952 and extensions 954 in some areas, and FIG. 9C is an image of the design template 950 after DSA. The extended portions further pinpoint the locations of the design shapes to their desired locations by providing additional guiding line portions, while also permitting a design shape to be closer to fill shapes to improve pattern uniformity and DSA yield when copolymers are deposited.

Figure 10:
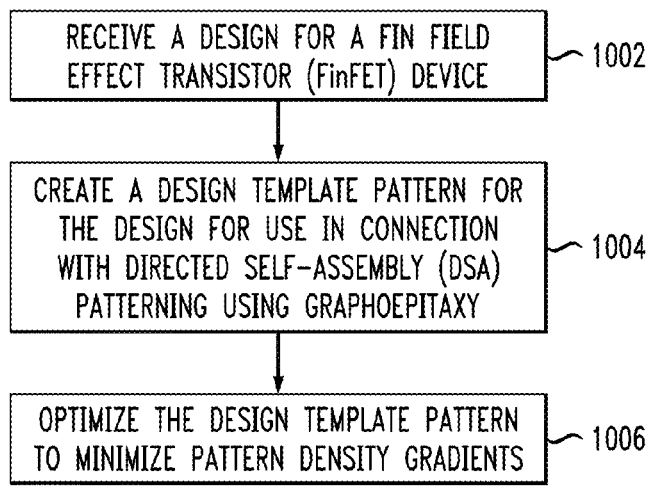
FIG. 10 is a flow diagram showing detail of a method for design template pattern optimization, according to an exemplary embodiment of the invention.

FIG. 10 is a flow diagram illustrating a method for design template pattern optimization, in accordance with an exemplary embodiment of the present invention. The method 1000 comprises receiving a design for a FinFET device (block 1002). The design is, for example, for a FinFET device such as a circuit, and includes a configuration of fins. The method further includes creating a design template pattern for the design for use in connection with DSA patterning using graphoepitaxy (block 1004), such as, for example, like the design template patterns described herein in, for example, FIGS. 1B, 3-5, 8A, 8B, 9B and 9C.

The method further includes, at block 1006, optimizing the design template pattern to minimize pattern density gradients. The design template pattern can include a plurality of guiding lines for guiding a copolymer deposited during the DSA patterning and optimizing can comprise altering the guiding lines. Altering the guiding lines can include, for example, merging at least two guiding lines separated by a gap into a continuous guiding line, reducing a thickness of a guiding line, extending a length of a guiding line, and widening a guiding line at least one of above or below the guiding line.

The design can include transitions from a first plurality of fins to a second plurality of fins as described herein, and altering the guiding lines can include inserting a gap in a guiding line at a portion of the guiding line corresponding to the transition. The guiding line may include a widened portion adjacent to the gap.

Optimizing may further comprise adding fill shapes to a design template pattern adjacent a location where a plurality of fins are to be formed. The method may further comprise generating cut mask data for producing a cut mask to remove regions with produced DSA lines that are not part of the design.

Figure 11:
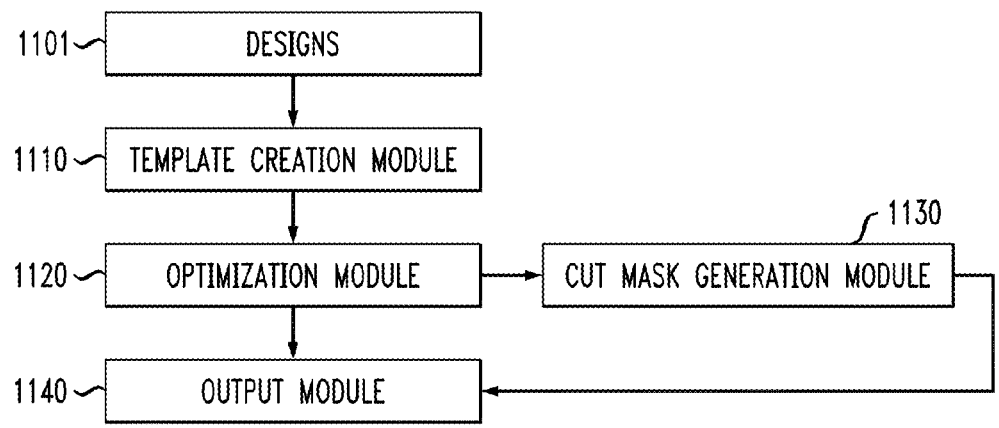
FIG. 11 is high-level diagram showing detail of a system for design template pattern optimization, according to an exemplary embodiment of the invention.

FIG. 11 shows a proposed system architecture showing detail of a system for design template pattern optimization, according to an exemplary embodiment of the invention. As shown in FIG. 11 by lines and/or arrows, the components of the system 1100 are operatively coupled to each other via, for example, physical connections, such as wired and/or direct electrical contact connections, and wireless connections, such as, for example, WiFi, BLUETOOTH®, IEEE 802.11, and/or networks, including but not limited to, a local area network (LAN), wide area network (WAN), cellular network, satellite network or the Internet.

The system 1100 for design template pattern optimization, comprises a template creation module 1110 configured to receive designs 1101 for a FinFET device, wherein the designs include a configuration of fins. The template creation module is configured to process the design data, and create a design template pattern for the design for use in connection with DSA patterning using graphoepitaxy. The system 1100 includes an optimization module 1120, which receives the created design template, and is configured to optimize the design template pattern to minimize pattern density gradients. The optimizing performed by the optimization module 1120 comprises running algorithms to determine how to alter the guiding lines, and altering the guiding lines on a design template.

Altering the guiding lines can include, for example, merging at least two guiding lines separated by a gap into a continuous guiding line, reducing a thickness of a guiding line, extending a length of a guiding line, and widening a guiding line at least one of above or below the guiding line. If the design includes transitions from a first plurality of fins to a second plurality of fins as described herein, altering the guiding lines can include inserting a gap in a guiding line at a portion of the guiding line corresponding to the transition. The guiding line may include a widened portion adjacent the gap.

The optimization module 1120 may also add fill shapes to a design template pattern adjacent a location where a plurality of fins are to be formed. The system 1100 may further comprise a cut mask generation module 1130 configured to generate cut mask data for producing a cut mask to remove regions with produced DSA lines that are not part of the design. The system 1100 also includes an output module 1140 to which data corresponding to an optimized design template and cut mask are sent to produce the optimized design template and cut mask for DSA processing.

The embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
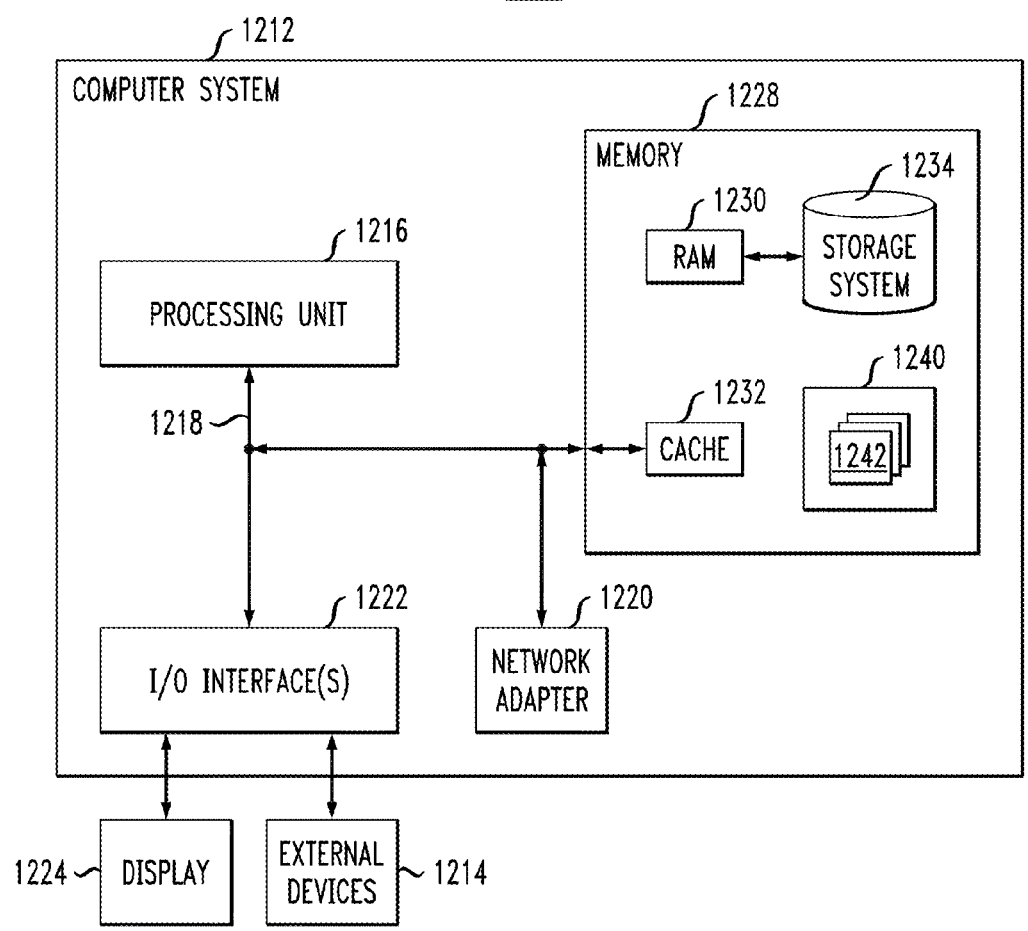
FIG. 12 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 12, in a computing node 1210 there is a computer system/server 1212, which is operational with numerous other general purpose or special purpose computing system environments or configurations. Examples of well-known computing systems, environments, and/or configurations that may be suitable for use with computer system/server 1212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1212 in computing node 1210 is shown in the form of a general-purpose computing device. The components of computer system/server 1212 may include, but are not limited to, one or more processors or processing units 1216, a system memory 1228, and a bus 1218 that couples various system components including system memory 1228 to processor 1216.

The bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1212 typically includes a variety of computer system readable media. Such media may be any available media that is accessible by computer system/server 1212, and it includes both volatile and non-volatile media, removable and non-removable media.

The system memory 1228 can include computer system readable media in the form of volatile memory, such as random access memory (RAM) 1230 and/or cache memory 1232. The computer system/server 1212 may further include other removable/non-removable, volatile/nonvolatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1218 by one or more data media interfaces. As depicted and described herein, the memory 1228 may include at least one program product having a set (e.g., at least one) of program modules that are configured to carry out the functions of embodiments of the invention. A program/utility 1240, having a set (at least one) of program modules 1242, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments of the invention as described herein.

Computer system/server 1212 may also communicate with one or more external devices 1214 such as a keyboard, a pointing device, a display 1224, etc., one or more devices that enable a user to interact with computer system/server 1212, and/or any devices (e.g., network card, modem, etc.) that enable computer system/server 1212 to communicate with one or more other computing devices. Such communication can occur via Input/Output (I/O) interfaces 1222. Still yet, computer system/server 1212 can communicate with one or more networks such as a local area network (LAN), a general wide area network (WAN), and/or a public network (e.g., the Internet) via network adapter 1220. As depicted, network adapter 1220 communicates with the other components of computer system/server 1212 via bus 1218. It should be understood that although not shown, other hardware and/or software components could be used in conjunction with computer system/server 1212. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for design template pattern optimization, comprising:
   receiving a design for a fin field effect transistor (FinFET) device, wherein the design includes a configuration of fins;
   creating a design template pattern for the design for use in connection with directed self-assembly (DSA) patterning using graphoepitaxy; and
   optimizing the design template pattern to minimize pattern density gradients;
   wherein the design template pattern includes a plurality of guiding lines for guiding a block-copolymer deposited during the DSA patterning and the optimizing comprises altering the guiding lines; and
   wherein the receiving, the creating and the optimizing steps are performed via a processing device and a memory.

2. The method according to claim 1, wherein the altering the guiding lines comprises merging at least two guiding lines separated by a gap into a continuous guiding line.

3. The method according to claim 1, wherein the altering the guiding lines comprises reducing a thickness of a guiding line.

4. The method according to claim 1, wherein the altering the guiding lines comprises extending a length of a guiding line.

5. The method according to claim 1, wherein the altering the guiding lines comprises widening a guiding line at least one of above or below the guiding line.

6. The method according to claim 1, wherein:
   the design includes a transition from a first plurality of fins to a second plurality of fins; and
   the altering the guiding lines comprises inserting a gap in a guiding line at a portion of the guiding line corresponding to the transition.

7. The method according to claim 6, wherein the guiding line includes a widened portion adjacent to the gap.

8. The method according to claim 1, wherein the optimizing further comprises adding fill shapes to the design template pattern adjacent to a location where a plurality of fins are to be formed.

9. The method according to claim 1, further comprising generating cut mask data for producing a cut mask to remove regions with produced DSA lines that are not part of the design.

* * * * *